US012748988B2

(12) United States Patent
Dong

(10) Patent No.: US 12,748,988 B2
(45) Date of Patent: Sep. 29, 2026

(54) DYNAMIC PROTOTYPE LEARNING FRAMEWORK FOR NON-HOMOPHILOUS GRAPHS

(71) Applicant: PAYPAL, INC., San Jose, CA (US)

(72) Inventor: Yanfei Dong, Singapore (SG)

(73) Assignee: PayPal, Inc., San Jose, CA (US)

( * ) Notice: Subject to any disclaimer, the term of this patent is extended or adjusted under 35 U.S.C. 154(b) by 690 days.

(21) Appl. No.: 18/184,407

(22) Filed: Mar. 15, 2023

(65) Prior Publication Data

US 2024/0311658 A1 Sep. 19, 2024

(51) Int. Cl.

*G06N 5/02* (2023.01)
*G06N 5/022* (2023.01)
*G06Q 20/36* (2012.01)
*G06Q 20/40* (2012.01)

(52) U.S. Cl.

CPC ............. *G06N 5/027* (2013.01); *G06N 5/022* (2013.01); *G06Q 20/3678* (2013.01); *G06Q 20/4016* (2013.01); *G06Q 2220/00* (2013.01)

(58) Field of Classification Search

CPC .... G06N 5/027; G06N 5/022; G06Q 20/4016; G06Q 20/3678; G06Q 2220/00
USPC .......................................................... 707/607
See application file for complete search history.

(56) References Cited

U.S. PATENT DOCUMENTS 11,238,368 B2 * 2/2022 Fang ...................... G06N 20/20
11,704,673 B1 * 7/2023 Drapeau ............ G06Q 20/4016 705/72
12,079,885 B2 * 9/2024 Tayeb ..................... G06N 3/045
12,229,777 B1 * 2/2025 Hayman .............. G06Q 20/389
2020/0005195 A1 * 1/2020 Fang ...................... G06F 21/604
2020/0167785 A1 * 5/2020 Kursun ................. H04L 43/045
2020/0394707 A1 * 12/2020 Guo ........................ G06Q 40/00
2021/0334811 A1 * 10/2021 Gu .......................... G06Q 40/12
2022/0044244 A1 * 2/2022 Chen ..................... G06Q 20/405
2022/0051125 A1 * 2/2022 Ho .................... G06F 18/23213
2022/0101401 A1 * 3/2022 Zhao ....................... G06Q 30/06

(Continued)

OTHER PUBLICATIONS

Yang, Yinghui, et al., "GHIC: A Hierarchical Pattern Clustering Algorithm for Grouping Web Transactions", IEEE Transactions on Knowledge and Data Engineering, vol. 17, Issue 9, Sep. 2005, pp. 1300-1304.*

(Continued)

*Primary Examiner* — Robert Stevens
(74) *Attorney, Agent, or Firm* — Haynes and Boone, LLP

(57) ABSTRACT

Methods and systems are presented for providing a framework for analyzing graphs that exhibit non-homophilous behavior. Under the framework, a structural analysis and a feature-based analysis will be performed on a sequence of graphs. When performing the feature-based analysis, various features are extracted from each node in the sequence of graphs, and clusters of nodes are identified from each graph based on the features. A set of evolving prototypes is generated to represent evolving characteristics of the clusters of nodes, and a set of persistent prototypes is generated to represent persistent characteristics of the clusters of nodes. Information derived from the structural analysis of the graphs, the set of evolving prototypes, and the set of persistent prototypes are embedded within the nodes of the graphs. The embedded information is then used to classify the nodes.

20 Claims, 8 Drawing Sheets

(56) References Cited

U.S. PATENT DOCUMENTS

| | | | | |
|---|---|---|---|---|
| 2022/0292340 | A1* | 9/2022 | Gogoglou | G06N 3/0895 |
| 2022/0394049 | A1* | 12/2022 | Abrahamian | G06F 40/134 |
| 2023/0107703 | A1* | 4/2023 | Zhang | G06N 20/00<br>705/39 |
| 2023/0237493 | A1* | 7/2023 | Gu | G06Q 40/02<br>705/44 |
| 2025/0005571 | A1* | 1/2025 | Das | G06Q 20/4016 |

OTHER PUBLICATIONS

Li, Yiming, et al., "Temporal Graph Representation Learning for Detecting Anomalies in E-payment Systems", ICDMW 2021, Auckland, New Zealand, Dec. 7-10, 2021, pp. 983-990.*
Vaganov, Danila, et al., "Workflow", Socinfo 2018, LNCS 11185, © Springer Nature, Switzerland, AG, 2018, pp. 439-454.*
Bruss, C. Bayan, et al., "DeepTrax: Embedding Graphs of Financial Transactions", ICMLA 2019, Boca Raton, FL, Dec. 16-19, 2019, pp. 126-133.*
Pei, Yulong, et al., "Subgraph Anomaly Detection in Financial Transaction Networks", ICAIF '20, New York, NY, Oct. 15-16, 2020, @ Association for Computing Machinery, 8 pages.*
Chandola, Varun, et al., "Anomaly Detection for Discrete Sequences: A Survey", IEEE Transactions on Knowledge and Data Engineering, vol. 24, No. 5, May 2012, pp. 823-839.*

* cited by examiner

DYNAMIC PROTOTYPE LEARNING FRAMEWORK FOR NON-HOMOPHILOUS GRAPHS

BACKGROUND

The present specification generally relates to machine learning models, and more specifically, to providing a machine learning model framework for analyzing graph data structures according to various embodiments of the disclosure.

RELATED ART

A graph is a non-Euclidean data structure that includes nodes and edges, which are often used to represent relationships among various entities. For example, a graph can represent personal relationships among various people within a social network. In such a graph, each node may represent a distinct person, and each edge that connects two nodes may represent a personal relationship (e.g., sibling, co-workers, spouses, etc.) between the corresponding two persons. In another example, a graph can represent transactions (e.g., payment transactions, data sharing transactions, etc.) conducted among various accounts. In such a graph, each node may represent a distinct account with a payment service provider, and each edge may represent one or more transactions conducted between the corresponding two accounts.

When the graph is implemented as a computer-based data structure (e.g., a graph data structure), the data in the graph can be accessed and analyzed by a computer module (e.g., a machine learning model such as a graph neural network). Due to the unique characteristics of a graph data structure and the way that the data is represented in the graph data structure, the data that is represented by a graph can be analyzed in a way that is difficult to do in a linear data structure. As a result, inferences and patterns related to the connected nodes can be drawn based on analyzing the data within the graph.

However, conventional graph analyzing tools (e.g., a graph neural network) typically analyze graphs under the assumption that the graphs exhibit homophilous behavior. In other words, these graph analyzing tools assume that nodes that are connected with each other (e.g., neighbors of each other) in a graph tend to share more similarities than nodes that are not connected in the graph. While such an assumption may be valid in many scenarios, graphs may not exhibit such a behavior for certain tasks. As such, there is a need for providing a framework for analyzing data within a graph data structure that exhibit non-homophilous behavior.

Figure 1:
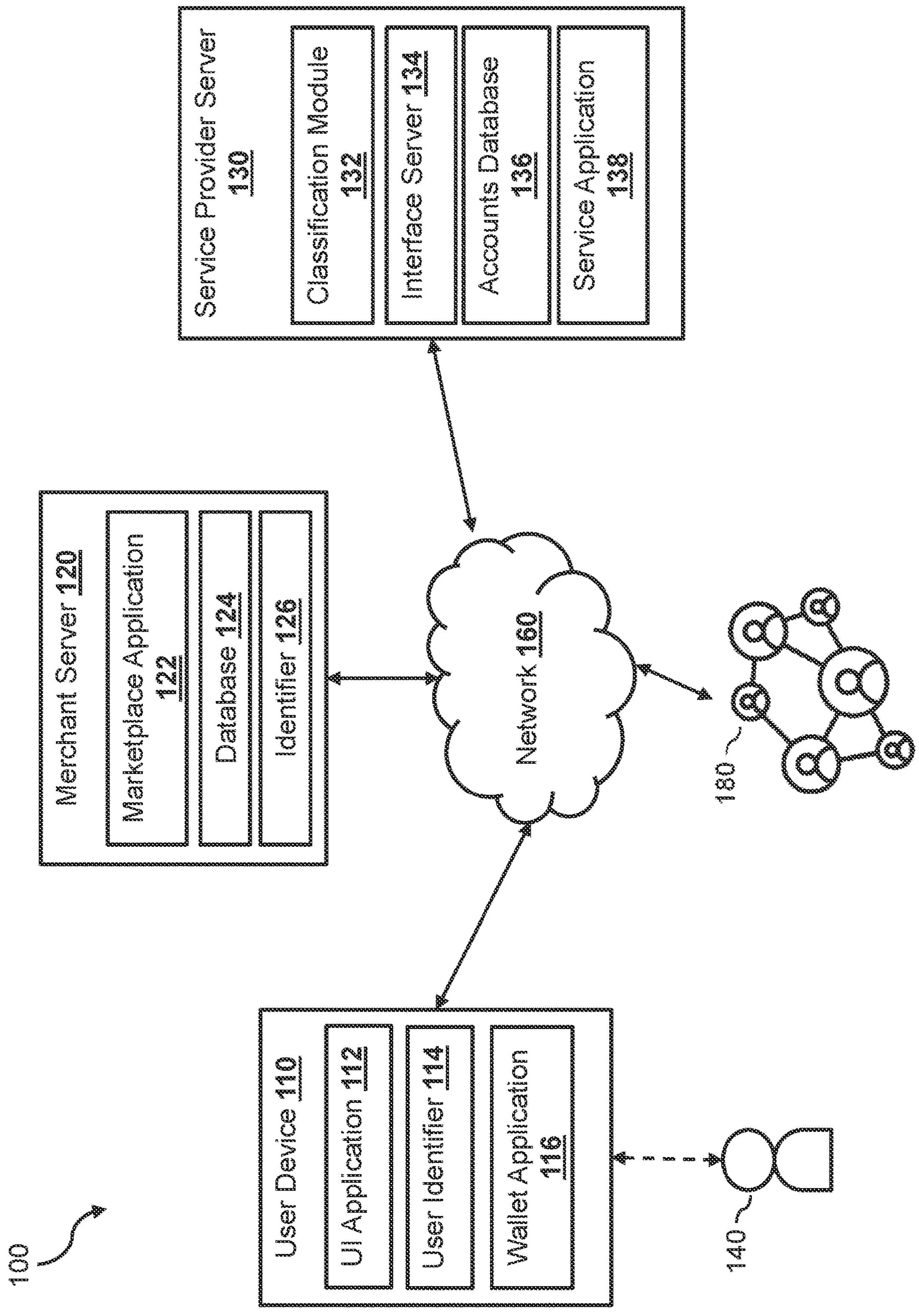
FIG. 1 is a block diagram illustrating a networked system that includes a graph analysis system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure includes methods and systems for providing a framework for analyzing graphs that exhibit non-homophilous behavior. As discussed herein, conventional graph analyzing tools (e.g., graph neural network) analyze graphs under the assumption that the graphs exhibit homophilous behavior. Under such an assumption, these graph analyzing tools often infer that nodes that are connected in a graph (e.g., being neighbors or immediate neighbors to each other in the graph) tend to share more similarities than nodes that are not connected in the graph. Due to the inherent nature of graphs (where nodes are connected based on certain existing relationships), such an assumption is usually valid for most scenarios. However, graphs may not always exhibit homophilous behavior in all scenarios. Using an example in which a graph is used to represent cryptocurrency transactions conducted among various wallets, the graph may be analyzed to determine which wallets are associated with malicious users (e.g., someone who demands ransom in exchange for the release of certain item, such as decrypting certain data, etc.). In this example, the graph may not exhibit homophilous behavior for the purpose of identifying the malicious wallets, as the malicious wallets are used mostly for receiving ransom money from wallets associated with the victims. Thus, most of the wallets that are connected to (e.g., being an immediate neighbor to) a malicious wallet are associated with the victims, who typically share little or no similarities with the malicious user. In another example, a graph may represent connectivity among various users of a dating application. The graph may not exhibit homophilous behavior when it is used to predict gender of a user of the dating application.

Furthermore, conventional graph analyzing tools typically analyze graphs in a transductive setting, that is, each analysis only involves a single graph. In such a transductive setting, the nodes for training and for testing purposes all exist in the same graph, and they are known to the graph analyzing tools beforehand. However, in certain scenarios, such as the example of analyzing and classifying cryptocurrency wallets as discussed herein, multiple graphs may be used to represent transactions within different time periods (e.g., time-series graphs), and the graphs that represent transactions in different time periods are to be analyzed together. Additionally, different nodes may appear in the different graphs (nodes representing different wallets may disappear in one time period and re-appear in another time period). The testing nodes and the training nodes may also appear in different graphs, and transferring knowledge from the training nodes to testing nodes can be a challenging task.

As such, according to various embodiments of the disclosure, a graph analysis system may use a framework (also referred to as a "dynamic prototype learning framework") to analyze graphs when the graphs do not exhibit homophilous behavior for certain tasks. Using the example described above, the graph analysis system may use the framework to identify malicious accounts (e.g., malicious digital wallets) associated with ransom demands (e.g., ransomware attacks) based on a graph that represents cryptocurrency transactions.

In some embodiments, when the graph analysis system receives a request to perform a task (e.g., classifying an account as a malicious account or a non-malicious account, etc.), the graph analysis system may obtain (or otherwise generate) a sequence of graphs representing the relationships among various entities represented by the graphs in different time periods, where each graph in the sequence of graphs represents a distinct time period. Each graph in the sequence of graphs may be implemented as (or converted to) graph data within a graph data structure that is readable by a computer system. When the task is related to classifying accounts with a payment provider, the graph analysis system may access data records associated with transactions conducted within a time duration (e.g., several days, several hours, etc.). The graph analysis system may divide the time duration into multiple distinct time periods (e.g., dividing the time duration into multiple one-day periods, dividing the time duration into multiple one-hour periods, etc.). The graph analysis system may then generate graphs that represent the transactions conducted within the different time periods. For example, the graph analysis system may access a first portion of the transactions that were conducted during a first time period (e.g., the first day, the first hour, etc.), and may generate a first graph based on the first portion of the transactions, such that the first graph may include nodes and edges that represent the transactions conducted among various wallets during the first time period. The graph analysis system may continue to generate other graphs for the remaining time periods in the same manner. In some embodiments, the sequence of graphs may be arranged in a chronological order such that the sequence of graphs represents an evolution of the relationships among the various entities throughout the time duration.

As discussed herein, due to the non-homophilous behavior of the sequence of graphs for this particular task (e.g., classifying an account as a malicious account or a non-malicious account, etc.), a conventional graph analytical tool (e.g., a graph neural network, etc.) may be incapable of performing the task accurately (e.g., having accuracy above a predetermined threshold, etc.), since the assumption that nodes connected with each other tend to share more similarities than nodes not connected with each other is not valid for this task. As such, under the framework as discussed herein, additional information that is independent from the topological structures of the graphs (e.g., how nodes are connected to each other) may be derived from the sequence of graphs, and embedded into the nodes in the sequence of graphs before a classifier is used to classify different nodes (e.g., corresponding to different accounts) in the sequence of graphs to improve the accuracy performance.

In some embodiments, in order to derive the additional information, attributes (also referred to as "features") associated with each node in the sequence of graphs may be extracted. Based on the number of attributes that can be extracted from each node, a node feature space may be created. The node feature space may be multi-dimensional, where each dimension in the node feature space corresponds to a distinct node attribute (or a node feature). Using the example where the sequence of graphs represent transactions conducted among various accounts (e.g., various digital wallets), the node attributes extracted from each node may include a number of outgoing transactions conducted through the wallet represented by the node, a number of incoming transactions conducted through the wallet represented by the node, an average amount associated with the transactions conducted through the wallet represented by the node, an average time between transactions, statistical data associated with neighboring nodes, etc.

Based on the respective attribute values associated with the nodes, the graph analysis system may place each node (or a point/a vector created for each node) at a corresponding location within the node feature space (which may be a latent space). Since the data (e.g., the points) within the node feature space (specifically the locations of the points within the node feature space) present information associated with the corresponding nodes (e.g., the various wallets, etc.) in a different way than the corresponding graphs (and where the information is not dependent on the topological structure of the graph), additional inferences and patterns that are not readily available and presented via the sequence of graphs may be derived from the points (e.g., the vectors) in the node feature space. In some embodiments, the graph analysis system may then embed information associated with the additional inferences and patterns in nodes of the sequence of the graphs to enable the graph analysis system to perform the task more accurately.

In some embodiments, the graph analysis system may derive patterns associated with the points (e.g., the vectors) in the node feature space. In some embodiments, the patterns may include various clusters of the points. For example, for each graph in the sequence of graphs, the graph analysis system may generate points (or vectors) for the nodes in the graph within the node feature space based on the attribute values associated with the nodes. The graph analysis may then derive patterns associated with (e.g., cluster) the points corresponding to the nodes in each graph. As such, the patterns associated with the vectors (e.g., various clusters) within the node feature space and the changes to the patterns through the sequence of the graphs may indicate how groups of similar accounts evolve over time.

In some embodiments, the graph analysis system may generate data representations that represent the patterns (e.g., clusters) of points and/or the changes to the patterns (e.g., clusters) over the time duration. The data representations may be referred to as "prototypes." Each prototype may represent information associated with a distinct pattern (e.g., a distinct cluster) of points in the node feature space. In some embodiments, the graph analysis system may generate two sets of prototypes based on the sequence of graphs obtained/generated for the task. A first set of prototypes may represent evolving characteristics of the patterns as the patterns evolve over the time duration (e.g., how the characteristics change over the time duration). In some embodiments, the graph analysis system may generate the first set of prototypes based on analyzing and/or learning the patterns of points corresponding to the sequence of graphs within the node feature space in a sequential and iterative manner. The graph analysis system may iteratively modify the first set of prototypes based on how the patterns of points evolve over the different time periods.

It is noted that as the characteristics of each individual node may change across the sequence of graphs (and certain nodes that appear in one graph may disappear in the next graph, and may re-emerge again in a subsequent graph based on the transaction patterns through the account represented by the node), patterns (e.g., clusters) may form and disappear in the node feature space over the different time periods. Thus, such prototypes that represent the evolving characteristics of the patterns may not be able to capture characteristics of certain patterns that were interrupted (e.g., disappear during one or more time periods). As such, the graph analysis system may generate a second set of prototypes based on the sequence of graphs. Similar to the first set of prototypes, each prototype in the second set of prototypes may represent a distinct pattern within the node feature space. However, unlike the first set of prototypes, the second set of prototypes may represent persistent characteristics of the patterns throughout the time duration. As such, instead of adjusting prototypes based on the changes to the patterns over the different time periods, the graph analysis system may analyze the patterns of points in the node feature space corresponding to the sequence of graphs collectively, and generate the second set of prototypes in a single pass. This way, characteristics of nodes that appear in some, but not all, of the sequence of graphs may be captured in the second set of prototypes.

In some embodiments, the graph analysis system may also provide the sequence of graphs to a graph neural network configured to analyze the sequence of graphs. The graph analysis system may then derive additional information based on the output from the graph neural network, the first set of prototypes, and the second set of prototypes, and may embed the additional information into the nodes of the graphs. The additional information may include a mix of information that is dependent on the topological structures of the graphs, and information that is independent from the topological structures of the graphs. After embedding the additional information, the graph analysis system may then use a classifier (which may be implemented as a machine learning model) to classify the nodes. The classification may indicate whether each node corresponds to a malicious account or a non-malicious account. In some embodiments, the output from a classifier may include a value. The graph analysis system may then determine whether an account represented by a node is a malicious account based on the value (e.g., whether the value exceeds a threshold value, etc.). Since the classifier classifies the nodes based on the additional information that includes information that is dependent on the topological structure of the graphs and information that is independent from the topological structure of the graphs, the graph analysis system is better able to handle non-homophily, which improves the classification task performed on the graphs that do not exhibit homophilous behavior.

FIG. 1 illustrates a networked system 100, within which the graph analysis system may be implemented according to one embodiment of the disclosure. Note that the present techniques may be applied in many different computing and technological environments, however, and are not limited to those shown in the figures. The networked system 100 includes a service provider server 130, a merchant server 120, a user device 110, and a cryptocurrency network 180 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The cryptocurrency network 180 may include multiple computer nodes for managing transactions associated with a cryptocurrency using a decentralized and distributed ledger (e.g., a blockchain). The decentralized and distributed ledger may store transaction data related to transactions using the cryptocurrency (also referred to as cryptocurrency transactions). Each computer node within the cryptocurrency network 180 manages a copy of the distributed ledger. When the computer nodes receive transaction data associated with a cryptocurrency transaction from a device (e.g., the user device 110, etc.), the computer nodes compete against each other in solving a mathematical problem (which is part of a verification process such as a proof-of-work process or a proof-of-stake process). Once a computer node solves the mathematical problem, the computer node may record the transaction (e.g., in a block) on its copy of the distributed ledger, and broadcast the block and the solution to the mathematical problem to the other computer nodes, such that the other computer nodes can update their copies of the distributed ledger. The computer node that won (e.g., the fastest to solve the mathematical problem) would be granted the right to receive a compensation (e.g., in the form of a mined coin and/or a service fee charged to a party to the transaction).

The user device 110, in one embodiment, may be utilized by a user 140 to interact with the merchant server 120, the cryptocurrency network 180, and/or the service provider server 130 over the network 160. For example, the user 140 may use the user device 110 to conduct an online transaction with the merchant server 120 via websites hosted by, or mobile applications associated with, the merchant server 120. The user 140 may also conduct cryptocurrency transactions by directly interacting with the cryptocurrency network 180 (e.g., by communicating transaction data to one or more computer nodes within the cryptocurrency network 180), or via the service provider server 130. The user 140 may also log in to a user account (or a digital wallet) to access account services or conduct electronic transactions (e.g., account transfers or payments, purchasing goods and/or services, etc.) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser, a mobile payment application, etc.), which may be utilized by the user 140 to interact with the merchant server 120, the cryptocurrency network 180, and/or the service provider server 130 over the network 160. In one implementation, the user interface application 112 includes a software program (e.g., a mobile application) that provides a graphical user interface (GUI) for the user 140 to interface and communicate with the service provider server 130, the cryptocurrency network 180, and/or the merchant server 120 via the network 160. In another implementation, the user interface application 112 includes a browser module that provides a network interface to browse information available over the network 160. For example, the user interface application 112 may be implemented, in part, as a web browser to view information available over the network 160.

The user device 110 may include a wallet application 116 configured to facilitate payments for the user 140. In some embodiments, the wallet application 116 may be associated with a digital wallet of the user 140 such that funds in a cryptocurrency can be transferred from the digital wallet of the user 140 to another digital wallet of another user (e.g., a wallet associated with another user, a wallet associated with the merchant server 120, a wallet associated with the service provider server 130, etc.) using the wallet application 116. In some embodiments, the wallet application 116 may be configured to perform cryptocurrency transactions through communication with the cryptocurrency network 180 and/or the service provider server 130. The user 140, through the user interface provided by the wallet application 116 on the user device 110, may initiate a cryptocurrency transaction (e.g., transferring a particular amount in a cryptocurrency from the digital wallet of the user 140 to another digital wallet). For example, the user 140 may specify an identity of the recipient digital wallet and an amount in the cryptocurrency via the user interface of the wallet application 116. The wallet application 116 may transmit the transaction data associated with the cryptocurrency transaction to the cryptocurrency network 180.

The user device 110, in one embodiment, may include at least one identifier 114, which may be implemented, for example, as operating system registry entries, cookies associated with the user interface application 112 and/or the wallet application 116, identifiers associated with hardware of the user device 110 (e.g., a media control access (MAC) address), or various other appropriate identifiers. In various implementations, the identifier 114 may be passed with a user login request to the service provider server 130 via the network 160, and the identifier 114 may be used by the service provider server 130 to associate the user 140 with a particular user account, a particular digital wallet, and/or a particular profile.

In various implementations, the user 140 is able to input data and information into an input component (e.g., a keyboard) of the user device 110. For example, the user 140 may use the input component to interact with the UI application 112 (e.g., to retrieve content from third-party servers such as the merchant server 120, to transmit cryptocurrency transaction data to the cryptocurrency computer network 180, to provide inputs related to a goal to the service provider server 130, etc.).

While only one user device 110 is illustrated in the networked system 100, it has been contemplated that multiple user devices (each similar to the user device 110), may be connected to the network 160 to perform transactions with other devices (e.g., the user device 110, the merchant server 120, the cryptocurrency network 180, and/or the service provider server 130, etc.). Each of the other user devices may include similar hardware and software components as the user device 110 to enable their respective users to interact with the merchant server 120, the cryptocurrency network 180, and the service provider server 130 through the user devices.

The merchant server 120, in various embodiments, may be maintained by a business entity (or in some cases, by a partner of a business entity that processes transactions on behalf of business entity). Examples of business entities include merchants, resource information providers, utility providers, real estate management providers, social networking platforms, etc., which offer various items for viewing, accessing, and/or purchasing, and process payments for the purchases. As shown, the merchant server 120 may include a merchant database 124 for identifying available items, which may be made available to the user device 110 for viewing and purchase by the user.

The merchant server 120, in one embodiment, may include a marketplace application or server 122, which may be configured to provide information (e.g., displayable content) over the network 160 to the user interface application 112 of the user device 110. In one embodiment, the marketplace application 122 may include a web server that hosts a merchant website for the merchant. For example, the user 140 of the user device 110 may interact with the marketplace application 122 through the user interface application 112 over the network 160 to search and view various items available for access and/or purchase in the merchant database 124. The merchant server 120, in one embodiment, may be associated with at least one merchant identifier 126, which may be included as part of the one or more items made available for purchase so that, e.g., particular items are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.). In some embodiments, the merchant server 120 may be associated with a digital wallet for receiving funds, including cryptocurrency, from other digital wallets for purchasing items from the business entity.

While only one merchant server 120 is shown in FIG. 1, it has been contemplated that multiple merchant servers, each associated with a different merchant, may be connected to the user device 110 and the service provider server 130 via the network 160.

The service provider server 130, in one embodiment, may be maintained by a transaction processing entity or an online payment service provider, which may provide processing for electronic transactions between different entities (e.g., among the users, between a user and one or more business entities (e.g., the business entity associated with the merchant server 120, etc.), or other types of payees. As such, the service provider server 130 may include a service application 138, which may be adapted to interact with the user device 110, the cryptocurrency network 180, and/or the merchant server 120 over the network 160 to facilitate the searching, selection, purchase, fund transfers, payment of items, and/or other services offered by the service provider server 130. In some embodiments, the service provider server 130 is one of the computer nodes within the cryptocurrency network 180, configured to maintain the distributed ledger of a cryptocurrency. In one example, the service provider server 130 may be provided by PayPal®, Inc., of San Jose, California, USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions (e.g., in fiat currency and/or cryptocurrency, etc.) between a user and a merchant or between any two entities (e.g., between two users, etc.). In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds.

The service provider server 130 may also include an interface server 134 that is configured to serve content (e.g., web content) to users and interact with users. For example, the interface server 134 may include a web server configured to serve web content in response to HTTP requests. In another example, the interface server 134 may include an application server configured to interact with a corresponding application (e.g., a service provider mobile application) installed on the user device 110 via one or more protocols (e.g., RESTAPI, SOAP, etc.). As such, the interface server 134 may include pre-generated electronic content ready to be served to users. For example, the interface server 134 may store a log-in page and is configured to serve the log-in page to users for logging into user accounts of the users to access various services provided by the service provider server 130 (e.g., such as cryptocurrency transaction services as disclosed herein). The interface server 134 may also include other electronic pages associated with the different services (e.g., purchase payment services, electronic transaction services, etc.) offered by the service provider server 130. As a result, a user (e.g., the user 140, or a merchant associated with the merchant server 120, etc.) may access a user account associated with the user and access various services offered by the service provider server 130, by generating HTTP requests directed at the service provider server 130.

The service provider server 130, in one embodiment, may be configured to maintain one or more user accounts and merchant accounts in an account database 136, each of which may be associated with a profile and may include account information associated with one or more individual users (e.g., the user 140 associated with user device 110, etc.) and merchants. The account information may include an identifier of a digital wallet associated with each user account of a user. In one implementation, a user may have credentials to authenticate or verify identity with the service provider server 130. Thus, the service provider server may store the credentials of the users in corresponding records of the account database 136 associated with the user accounts.

In various embodiments, the service provider server 130 includes a classification module 132 that implements the graph analysis system as discussed herein. In particular, the classification module 132 may be configured to analyze accounts of various users and/or merchants using the dynamic prototype learning framework as disclosed herein, and to identify accounts that are malicious (e.g., accounts that are involved in malicious activities such as being used to receive and funnel ransom money from victims or other activities that are deemed as or prohibited by an entity associated with the service provider server 130). In some embodiments, in order to facilitate efficient analyses of various accounts with the service provider server 130 (and activities conducted through the various accounts), the classification module 132 may generate (or otherwise obtain) one or more graphs that represent cryptocurrency transactions conducted among the various accounts of the service provider server 130. The graphs may include a sequence of graphs that corresponds to a sequence of time periods within a time duration (e.g., multiple one-hour time periods in a five-hour duration, etc.). In such an example, each graph may represent the transactions conducted among various account during the corresponding time period. Each graph may include nodes representing corresponding accounts and edges representing transactions conducted between the accounts.

As discussed herein, due to the nature of this classification task (e.g., classifying cryptocurrency accounts as malicious or non-malicious), the graphs may not exhibit homophilous behavior. As such, using solely conventional graph analysis tools (e.g., graph neural networks) for analyzing the accounts may not yield acceptable accuracy (e.g., an accuracy above a threshold) for the classification task, since conventional graph analysis tools typically analyze graphs under the assumption that all graphs exhibit homophilous behavior. To improve the accuracy performance of performing the classification task, the classification module 132 of some embodiments may analyze the sequence of graphs using the dynamic prototype learning framework.

Figure 2:
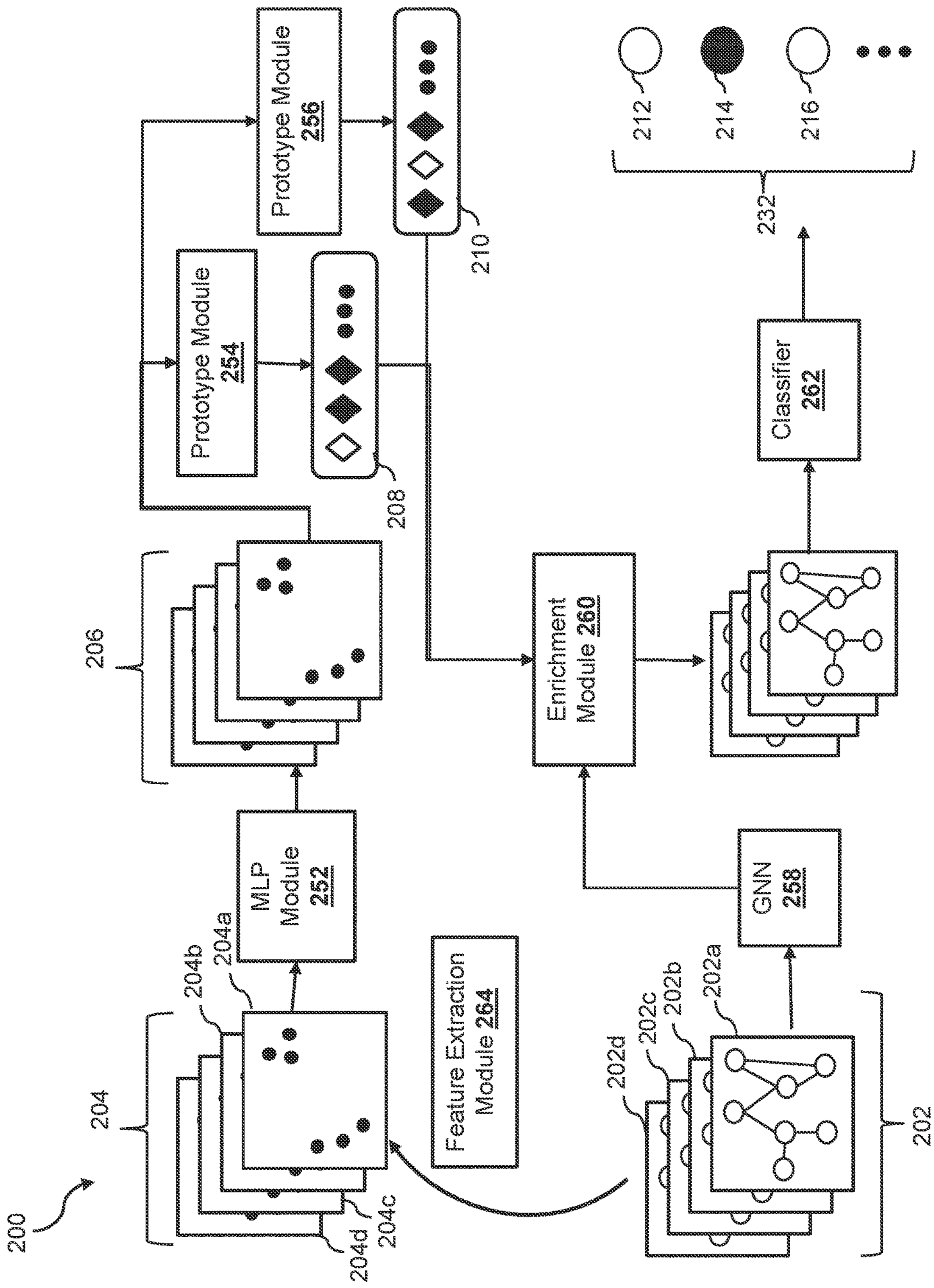
FIG. 2 illustrates a dynamic prototype learning framework according to an embodiment of the present disclosure.

FIG. 2 illustrates an example framework 200 under which the classification module 132 may analyze the sequence of graphs. In some embodiments, the framework 200 may include different modules, such as a multi-layer perceptron (MLP) module 252, prototype modules 254 and 256, a graph neural network (GNN) module 258, an enrichment module 260, a classifier 262, and a feature extraction module 264, that may all be part of the classification module 132. In some embodiments, the classification module 132 may generate, or otherwise obtain, a sequence of graphs 202. The sequence of graphs 202, which includes multiple graphs 202*a*, 202*b*, 202*c*, and 202*d*, represents transactions conducted within a time duration (e.g., four hours, four days, etc.). The time duration may be divided into multiple time periods, such that each graph within the sequence of graphs 202 may represent transactions conducted among different accounts within a corresponding time period (e.g., a corresponding hour, a corresponding day, etc.). In some embodiments, based on the classification task and/or other factors, the classification module 132 may determine the time duration for performing the classification task. For example, the classification module 132 may determine a shorter time duration for analysis when the classification task is more complicated, and may determine a longer time duration for analysis when the classification task is less complicated.

When the classification module 132 obtains the sequence of graphs 202, the classification module 132 may perform two different types of analyses on the graph data associated with the sequence of graphs 202 under the framework 200. For example, the classification module 132 may perform a structural analysis on the sequence of graphs 202 and a feature-based analysis on the sequence of graphs 202. In some embodiments, the classification module 132 may use the GNN module 258 to perform a structural analysis on the sequence of graphs 202. In some embodiments, the GNN module includes a graph neural network that is configured and trained to analyze each graph in the sequence of graphs 202 based on the features of the nodes and the connections (e.g., the edges) among the nodes within the graph.

Since the sequence of graphs 202 may not exhibit homophilous behavior with respect to the classification task, the structural analysis may introduce a bias (e.g., a bias that connected nodes share more similarities than unconnected nodes) that is unfavorable to the classification task. As such, the classification module 132 may also perform a feature-based analysis on the sequence of graphs 202 in addition to the structural analysis. In some embodiments, the feature-based analysis focuses on the features in each node in the sequence of graphs 202, rather than the connections associated with the node. Thus, the feature-based analysis may not have the same bias as the structural analysis. The output from the feature-based analysis may then be combined with the output from the structural analysis. This way, the structural information associated with the sequence of graphs 202 is retained while the graph analysis system is better able to handle non-homophily.

In some embodiments, to perform the feature-based analysis, the classification module 132 may use the feature extraction module 264 to extract the features (i.e., attributes) of each node in the sequence of graphs 202. In this example where the sequence of graphs 202 represents cryptocurrency transactions among various accounts with the service provider server 130, example features that can be extracted from each node may include a number of outgoing transactions conducted through the account represented by the node, a number of incoming transactions conducted through the account represented by the node, an average amount associated with the transactions conducted through the account represented by the node, an average time between transactions, statistical data associated with neighboring nodes, etc. It has been contemplated that different features may be extracted from different types of graphs, based on what the graphs and each node and/or edge in the graphs represent.

The classification module 132 may also create a node feature space 204 based on the types of features that can be extracted from the nodes from the sequence of graphs 202. The node feature space 204 may be multi-dimensional, where each dimension in the node feature space corresponds to a distinct node feature. Each dimension may be associated with a range of coordinate values that corresponds to different positions along that dimension. In some embodiments, the range of coordinate values may also correspond to the values of the corresponding feature. For example, for a dimension that corresponds to an average amount associated with transactions conducted through an account, the coordinates on that dimension may correspond to different monetary amounts. For a dimension that corresponds to a number of incoming transactions conducted through an account, the coordinates on that dimension may correspond to different transaction counts.

Thus, based on the different attribute values corresponding to the different features (or different attributes) extracted from a node from the sequence of graphs 202, the classification module 132 may place the node (or create a point for the node) at a position within the node feature space 204. In some embodiments, since a user may conduct transactions through an account during different time periods (e.g., on different days, in different hours of the days, etc.), the same node may appear in different graphs within the sequence of graphs 202. As such, in some embodiments, the classification module 132 may create/obtain different snapshots of the node feature space, such as snapshots 204*a*, 204*b*, 204*c*, and 204*d*. Each snapshot of the node feature space 204 may correspond to a different graph (in other words, corresponding to a different time period) in the sequence of graphs 202. For example, the snapshot 204*a* may correspond to the graph 202*a*, the snapshot 204*b* may correspond to the graph 202*b*, the snapshot 204*c* may correspond to the graph 202*c*, and the snapshot 204*d* may correspond to the graph 202*d*.

Figure 3:
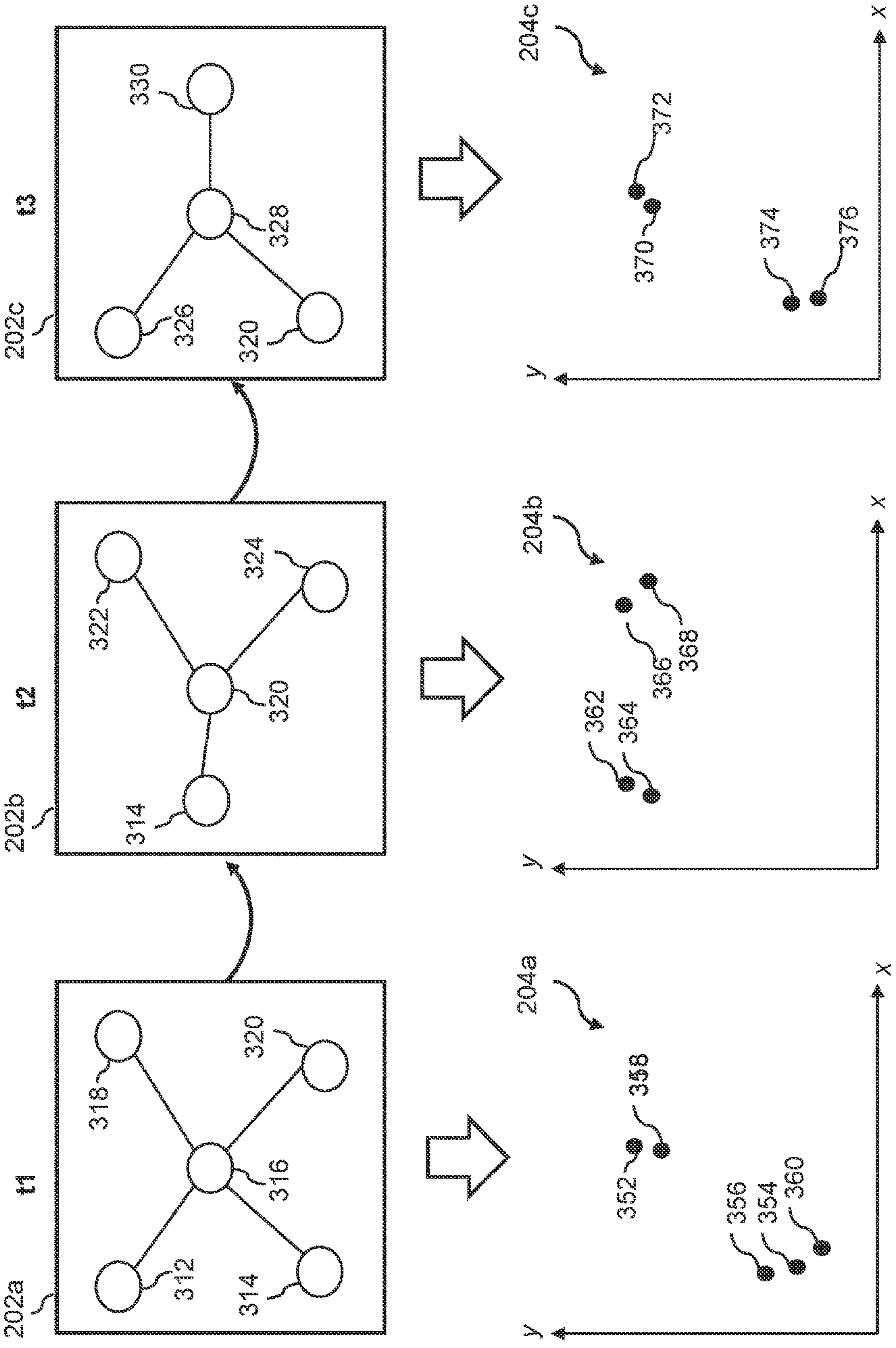
FIG. 3 illustrates translations of nodes to locations within a node feature space according to an embodiment of the present disclosure.

FIG. 3 illustrates the generation of different snapshots of node feature space based on the sequence of graphs 202 according to various embodiments of the disclosure. After obtaining the sequence of graphs 202, the feature extraction module 264 may access a first graph (e.g., the graph 202*a*) from the sequence of graphs 202, corresponding to the time period 't1'. In this example, the graph 202*a* may include various nodes, such as nodes 312, 314, 316, 318, and 320. The feature extraction module may extract different features from each of the nodes, and place the nodes (or points representing the nodes) in the snapshot of the node feature space 204*a*. For brevity and illustration purposes, the various snapshots of the node feature space 204*a*, 204*b*, and 204*c* are shown in this figure as having only two dimensions: an x-dimension and a y-dimension. However, in some embodiments, the node feature space 204 may include additional dimensions based on the number of features being extracted from the nodes.

The feature extraction module 264 may, for the node 312, extract a first attribute value corresponding to the x-dimension (e.g., a first feature) and a second attribute value corresponding to the y-dimension (e.g., a second feature). The feature extraction module 264 may then determine a location (e.g., an x-y coordinate) 352 within the snapshot of the node feature space 204*a* based on the first attribute value and the second attribute value. Similarly, based on the attribute values extracted from the other nodes, 314, 316, 318, and 320, the feature extraction module 264 may determine corresponding locations 254, 356, 358, and 360 for the nodes within the snapshot of the node feature space 204*a*.

The feature extraction module 264 may then access a second graph (e.g., the graph 202*b*) from the sequence of graphs 202. The feature extraction module 264 may also extract attribute values for each of the nodes in the graph 202*b*, and determine locations within the snapshot of the node feature space 204*b* based on the extracted attribute values. It is noted that the nodes may not be the same across the different graphs 202*a*, 202*b*, 202*c*, and 202*d*. For example, the node 312 does not appear in the graph 202*b* (e.g., possibly because no transactions were conducted through the account represented by the node 312 during the time period 't2' corresponding to the graph 202*b*). In this example, the graph 202*b* also includes new nodes, such as nodes 322 and 324, that do not appear in the graph 202*a* (e.g., possibly because no transactions were conducted through the accounts represented by the nodes 322 and 324 during the time period 't1' but transactions were conducted during the time period 't2').

Furthermore, even when the same node appears in multiple graphs (e.g., the graphs 202*a* and 202*b*), different positions may be determined for that same node in different snapshots of the node feature space (e.g., the snapshots 204*a* and 204*b*) due to different attribute values extracted from the same node in the different graphs 202*a* and 202*b* (e.g., different number of transactions/different amounts may be conducted through the same accounts in the different time periods). In this example, the feature extract module 264 may determine locations 362, 364, 366, and 368 for the nodes 314, 320, 322, and 324 based on attribute values extracted from the nodes in the graph 202*b*.

Similarly, the feature extraction module 264 may access a third graph (the graph 202*c*) from the sequence of graphs 202. In this example, the graph 202*c* includes the node 320 that appears in the previous two graphs 202*a* and 202*b*, and new nodes 326, 328, and 330. The feature extraction module 264 may use the same techniques to determine locations 370, 372, 374, and 376 within the snapshot of the node feature space 204*c* for the nodes 320, 326, 328, and 330 in the graph 202*c*.

Referring back to FIG. 2, in order to improve the efficiency and accuracy of analyzing the data in the node feature space, the classification module 132 may use the MLP module 252 to encode the positions of the nodes in the node feature space into positions in a latent space 206, which may have a larger number or a smaller number of dimensions that the node feature space 204. In some embodiments, the encoded positions within the latent space 206 are more representative than the positions within the node feature space, which better enables the classification module 132 to analyze the node features associated with the different wallets. In some embodiments, the classification module 132 may analyze the nodes within the node feature space 204 and/or the latent space 206. Analyzing the nodes within the node feature space 204 and/or the latent space 206 may enable the classification module 132 to derive insights that may otherwise not available to the classification module 132 when analyzing the sequence of graphs 202 (e.g., the structural analysis). Furthermore, analyzing the nodes within the node feature space 204 and/or the latent space 206 may also reduce or eliminate the structural bias that may be unfavorable for the classification task at hand.

In some embodiments, the classification module 132 may derive patterns associated with (e.g., cluster) the nodes based on the positions of the nodes within the node feature space 204 or the latent space 206. Based on the patterns associated with the nodes, the classification module 132 may use the prototype modules 254 and 256 to generate various prototypes for the classification task. Each of the prototype modules 254 and 256 may generate prototypes that represent the patterns associated with the nodes (e.g., clusters) within the node feature space 204 or the latent space 206. In some embodiments, the prototypes generated by each of the prototype modules 254 and 256 may represent different insights derived from the patterns associated with nodes. For example, based on the patterns associated with nodes in the node feature space 204 or the latent space 206, the prototype module 254 may generate prototypes 208 (also referred to as "evolving prototypes") that represent evolving characteristics of the patterns as the patterns evolve over the time duration (e.g., how the characteristics of the patterns change over different time periods in the time duration). In some embodiments, the prototype module 254 may generate the prototypes 208 based on analyzing and/or learning the patterns associated with the nodes corresponding to the sequence of graphs 202 in a sequential and iterative manner. In some embodiments, the prototype module 254 may iteratively modify the prototypes 208 based on new insights derived from the changes in the patterns associated with nodes in a subsequent time period.

In some embodiments, based on the patterns associated with the nodes (e.g., clusters) in the node feature space 204 or the latent space 206, the prototype module 256 may generate prototypes 210 (also referred to as "persistent prototypes") that represent persistent characteristics of the patterns throughout the different time periods in the time duration. Instead of adjusting prototypes based on the changes to the patterns over the time duration, the prototype module 256 may analyze and/or learn from the nodes within all of the snapshots of the node feature space collectively, and generate the prototypes 210 in a single pass.

Figure 4:
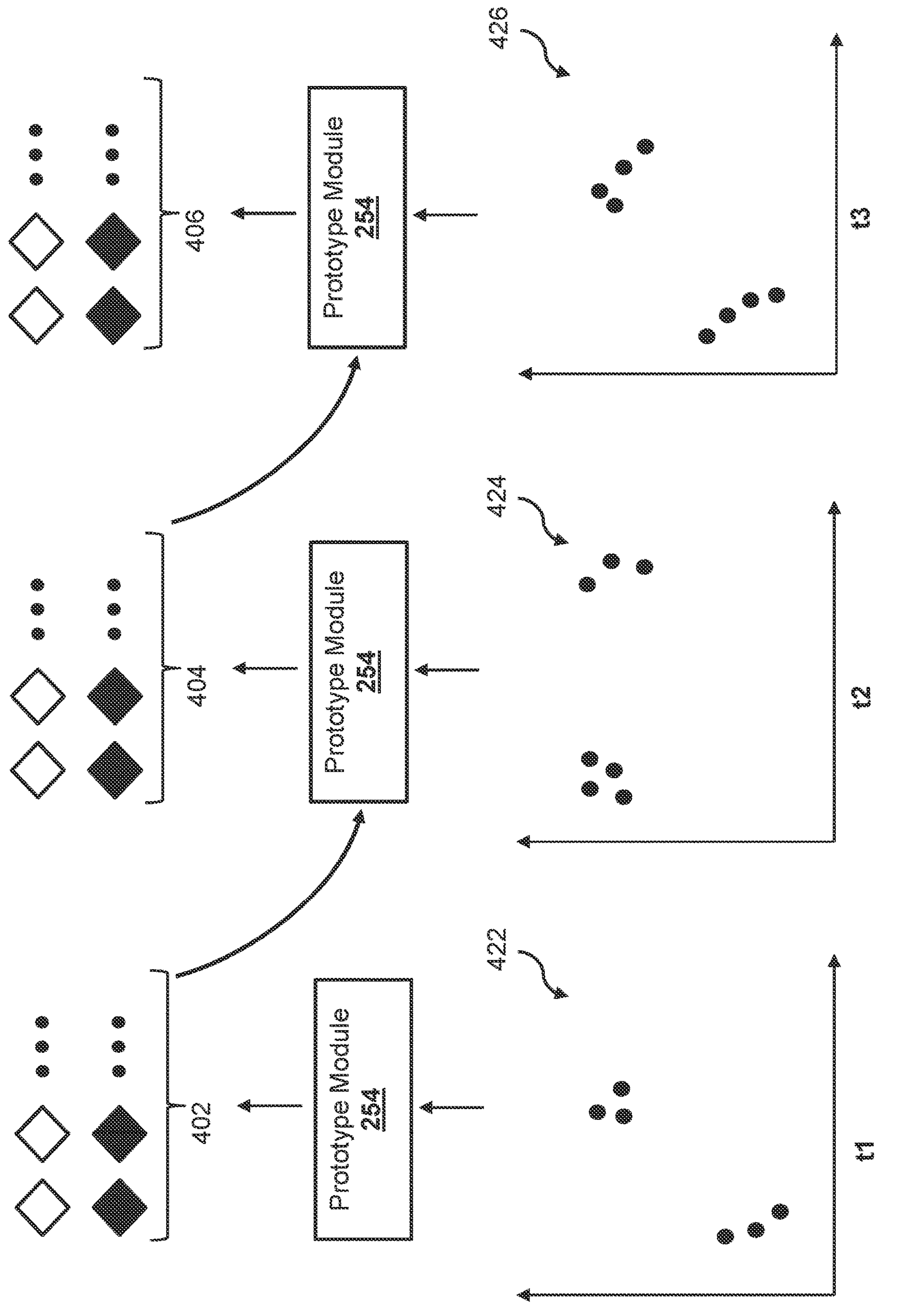
FIG. 4 illustrates steps for generating evolving prototypes according to an embodiment of the present disclosure.

FIG. 4 illustrates the steps for generating the evolving prototypes according to various embodiments of the disclosure. In some embodiments, the prototype module 254 may initially access, during a first iteration, the patterns associated with the nodes in a first space snapshot 422 (e.g., the node feature space 204 or the latent space 206). In some embodiments, the first space snapshot 422 may correspond to the snapshot of the node feature space 204*a*. The prototype module 254 may derive prototypes 402 based on the patterns associated with nodes in the first space snapshot 422. In some embodiments, each prototype within the prototypes 402 may represent a distinct pattern (e.g., a distinct cluster of nodes), and include attributes associated with the corresponding pattern (e.g., the corresponding cluster of nodes) (e.g., positions of the centroid of the cluster within the first space snapshot 422, a number of nodes in the cluster, attributes of the nodes within the cluster, etc.). Based on the characteristics of the various patterns in the first space snapshot 422, the prototype module 254 may classify the corresponding prototypes, such as malicious prototypes (indicated as black diamonds in the figure) and non-malicious prototypes (indicated as white diamonds in the figure).

During a second iteration, the prototype module 254 may then access a second space snapshot 424 (e.g., the node feature space 204 or the latent space 206), and may generate the prototypes 404 based on a combination of the prototypes 402 generated in the previous iteration and the patterns associated with the nodes in the second space snapshot 424. In some embodiments, the second space snapshot 424 may correspond to the snapshot of the node feature space 204*b*. In some embodiments, the prototype module 254 may generate the prototypes 404 by modifying the prototypes 402 based on new insights derived from the second space snapshot 424.

During a third iteration, the prototype module 254 may then access a third space snapshot 426 (e.g., the node feature space 204 or the latent space 206), and may generate the prototypes 406 based on a combination of the prototypes 404 generated in the previous iteration and the patterns associated with the nodes in the third space snapshot 426. In some embodiments, the third space snapshot 426 may correspond to the snapshot of the node feature space 204*c*. In some embodiments, the prototype module 254 may generate the prototypes 406 by modifying the prototypes 404 based on new insights derived from the third space snapshot 426. The prototype module 254 may continue to iteratively generate new prototypes (e.g., modifying the prototypes from the previous iterations) until all of the space snapshots have been analyzed. Thus, the resulting protypes (e.g., the prototypes 406) may represent how the patterns (e.g., clusters) evolve through the different time periods within the time duration. However, since certain nodes (and corresponding clusters of nodes) may appear in one space snapshot and may disappear in another space snapshot (and/or re-appearing in another subsequent space snapshot), as the prototypes 208 evolve through the iterations, the prototypes 208 tend to focus (e.g., emphasize) patterns derived from recent iterations (e.g., representing more recent time periods) and defocus (e.g., de-emphasize) patterns derived from the earlier iterations (e.g., representing older time periods). As such, certain pattern information may not be captured by the prototypes 208.

Figure 5:
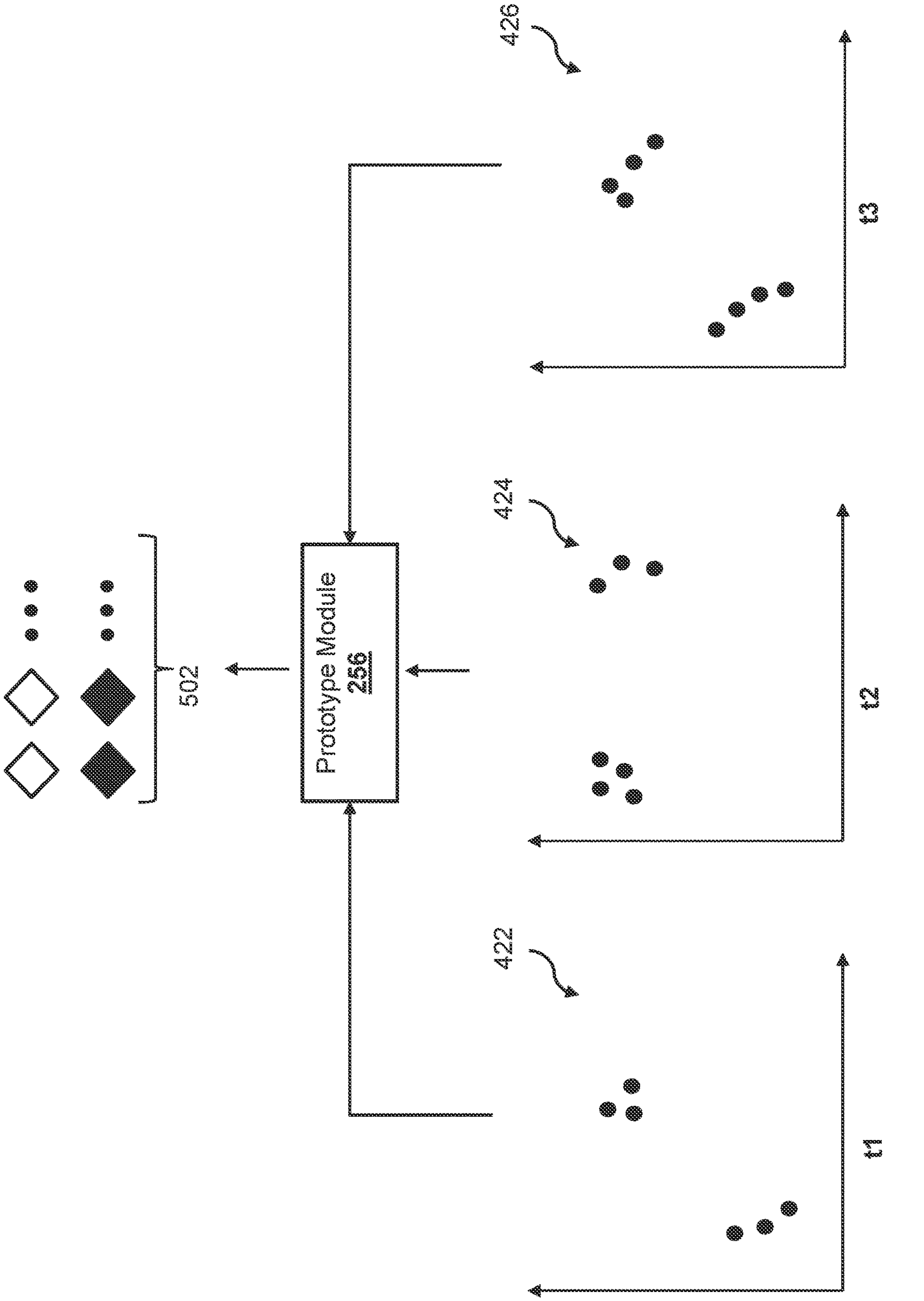
FIG. 5 illustrates the generation of persistent prototypes according to an embodiment of the present disclosure.

FIG. 5 illustrates the steps for generating the persistent prototypes according to various embodiments of the disclosure. Unlike the prototype module 254, the prototype module 256 may access and analyze the patterns associated with nodes in the different space snapshots 422, 424, and 426 collectively and/or simultaneously. Based on the collective information from the patterns in the space snapshots 422, 424, and 426, the prototype module 256 may generate prototypes 502. In some embodiments, based on the characteristics of the various patterns in the space snapshots 422, 424, and 426, the prototype module 256 may also classify the prototypes 502, such as malicious prototypes (indicated as black diamonds in the figure) and non-malicious prototypes (indicated as white diamonds in the figure). Since the patterns associated with the nodes (e.g., the clusters of nodes) from the different space snapshots 422, 424, and 426 are analyzed collectively, the prototype module 256 may generate prototypes for the clusters, even when the patterns only appear in some, but not all, of the space snapshots. Thus, the information that the evolving prototypes cannot capture may be captured by the persistent prototypes.

Referring back to FIG. 2, after performing the structural analysis and the feature-based analyses, the classification module 132 may use the enrichment module 260 to combine the output from the structural analysis and the feature-based analyses. For example, the output of the GNN module 258 may include information derived from the structure of the sequence of graphs 202. The enrichment module 260 may embed the portions of the information relevant to each node within the node of the sequence of graphs 202. Similarly, the enrichment module 260 may also embed data from the prototypes 208 and 210, that is relevant to each node in the sequence of graphs 202, within the node. For example, information associated with a prototype may be embedded within each node that is part of a pattern (e.g., a cluster) represented by the prototype. The nodes with the embedded data (from the outputs of the GNN module 258, the prototype module 254 and the prototype module 256) may then be provided to the classifier 262 configured and/or trained to classify the nodes based on the embedded data. The classifier 262 may then produce a set of classified nodes 232. The set of classified nodes may include all of the nodes in the sequence of the graphs 202, and may indicate, for each node, whether the node is associated with a malicious account or a non-malicious account. For example, the set of classified nodes 232 may include a node 212 classified as a non-malicious account (as indicated by the white icon), a node 214 classified as a malicious account (as indicated by the black icon), and a node 216 classified as a non-malicious account (as indicated by the white icon).

Based on the classification of the various accounts represented by the nodes in the sequence of graphs 202, the classification module 132 may perform actions to some of the accounts. For example, the classification module 132 may lock/suspend the accounts that are classified as malicious accounts, or may increase an authentication level for authenticating a user for accessing the accounts that are classified as malicious accounts.

Figure 6:
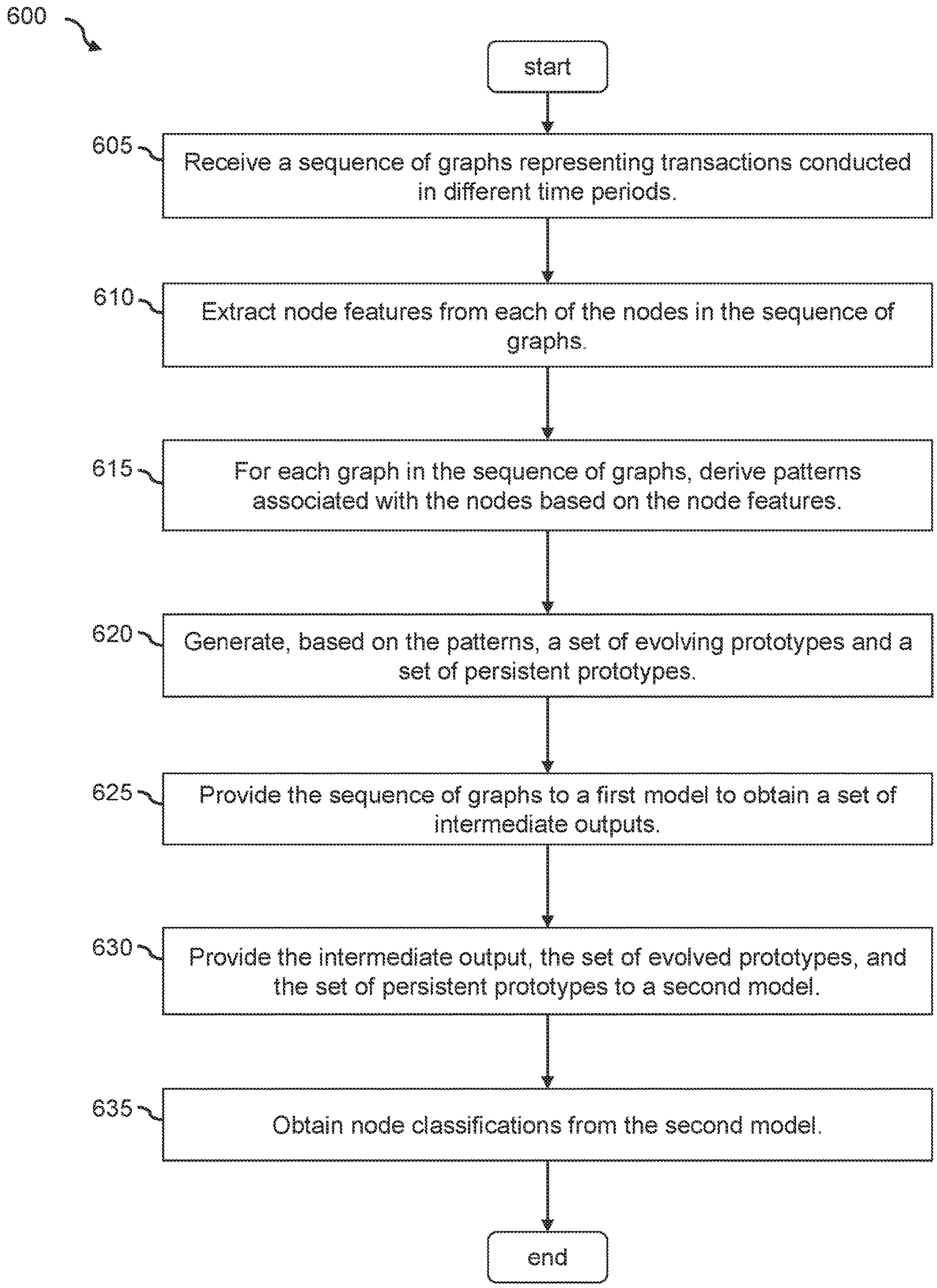
FIG. 6 illustrates an example process flow for analyzing a sequence of graph under the dynamic prototype learning framework according to an embodiment of the present disclosure.

FIG. 6 illustrates a process 600 for analyzing graphs under the dynamic prototype learning framework according to various embodiments of the disclosure. In some embodiments, at least a portion of the process 600 may be performed by the classification module 132. The process 600 begins by receiving (at step 605) a sequence of graphs representing transactions conducted in different time periods. For example, the classification module 132 may obtain the sequence of graphs 202 representing cryptocurrency transactions conducted through various accounts with the service provider server 130 within a time duration (e.g., several hours, several days, etc.). The sequence of graphs 202 may include multiple graphs (e.g., the graphs 202*a*, 202*b*, 202*c*, and 202*d*, etc.), where each graph in the sequence of graphs may represent cryptocurrency transactions conducted within a distinct time period in the time duration (e.g., a distinct hour, a distinct day, etc.).

The process 600 then extracts (at step 610) node features from each of the nodes in the sequence of graphs and transforms (at step 615) the node features into latent features. For example, the feature extraction module 264 may extract, from each node in the sequence of graphs 202, attribute values corresponding to different features. The feature extraction module 264 may generate a node feature space that includes multiple dimensions corresponding to the different features, such that the feature extraction module 264 may determine, for each node, a location within the node feature space, based on the attribute values associated with the node. Since the attribute values of a node may vary from graph to graph in the sequence of graphs 202, the feature extraction module 264 may generate different snapshots of the node feature space, where each snapshot may correspond to a distinct graph within the sequence of graphs 202. In some embodiments, the MLP module 252 may transform the extracted node features 204 (e.g., the vectors in the node feature space) into latent features 206.

The process 600 then generates (at step 620) a set of evolving prototypes and a set of persistent prototypes that represent the latent features. For example, the prototype module 254 may analyze the patterns associated with the nodes in a sequential manner based on the sequence of graphs 202, and may generate evolving prototypes 208 that represent evolving characteristics of the patterns as they evolved over the different time periods in the time duration. On the other hand, the prototype module 256 may analyze the patterns associated with the nodes from the sequence of graphs 202 collectively and simultaneously, and may generate a set of persistent prototypes 210 that represent persistent characteristics of the patterns corresponding to the sequence of graphs 202.

The process 600 also provides (at step 625) the sequence of graphs to a first model to obtain a set of intermediate outputs. For example, the classification module 132 may provide the sequence of graphs 202 to the GNN module 258. The GNN module 258 may be configured and trained to analyze the structural characteristics of the sequence of graphs 202 (e.g., how the nodes are connected to each other), and may generate the intermediate output that represents insights derived from the structural characteristics of the sequence of graphs 202. In some embodiments, the step 625 may be performed in parallel with the steps 615-620.

The process 600 then provides (at step 630) the intermediate output, the set of evolving prototypes, and the set of persistent prototypes to a second model, and obtains (at step 635) node classifications from the second model. For example, the enrichment module 260 may merge the data from the prototypes 208 and the prototypes 210 with the output from the GNN module 258. In some embodiments, the enrichment module 260 may embed data, derived from the output from the GNN module 258 and the prototypes 208 and 210, into each node of the sequence of graphs 210. The nodes that are embedded with the additional data may then be provided to the classifier 262. Based on the data embedded in the nodes, the classifier 262 may classify the nodes as malicious or non-malicious.

Figure 7:
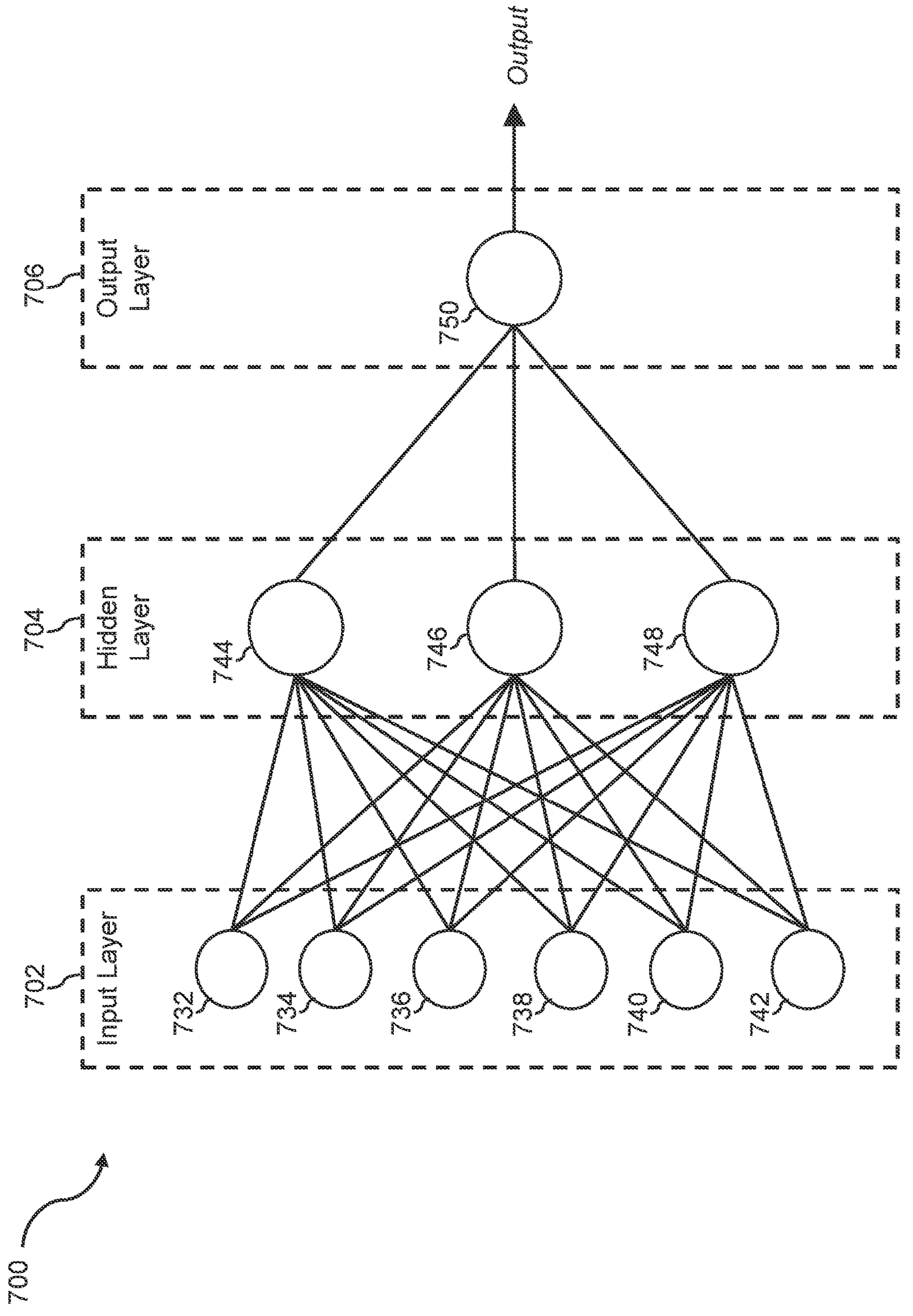
FIG. 7 illustrates an example neural network that can be used to implement a machine learning model according to an embodiment of the present disclosure.

FIG. 7 illustrates an example artificial neural network 700 that may be used to implement any machine learning models (e.g., the GNN module 258, the MLP module 252, the prototype module 254, the prototype module 256, the enrichment module 260, and the classifier 262, etc.). As shown, the artificial neural network 700 includes three layers—an input layer 702, a hidden layer 704, and an output layer 706. Each of the layers 702, 704, and 706 may include one or more nodes. For example, the input layer 702 includes nodes 732, 734, 736, 738, 740, and 742, the hidden layer 704 includes nodes 744, 746, and 748, and the output layer 706 includes a node 750. In this example, each node in a layer is connected to every node in an adjacent layer. For example, the node 732 in the input layer 702 is connected to all of the nodes 744, 746, and 748 in the hidden layer 704. Similarly, the node 744 in the hidden layer is connected to all of the nodes 732, 734, 736, 738, 740, and 742 in the input layer 702 and the node 750 in the output layer 706. Although only one hidden layer is shown for the artificial neural network 700, it has been contemplated that the artificial neural network 700 used to implement any one of the computer-based models may include as many hidden layers as necessary.

In this example, the artificial neural network 700 receives a set of inputs and produces an output. Each node in the input layer 702 may correspond to a distinct input. For example, each node in the input layer 702 may correspond to an input feature (e.g., attributes of a node within the sequence of graphs 202, etc.). In some embodiments, each of the nodes 744, 746, and 748 in the hidden layer 704 generates a representation, which may include a mathematical computation (or algorithm) that produces a value based on the input values received from the nodes 732, 734, 736, 738, 740, and 742. The mathematical computation may include assigning different weights (e.g., node weights, etc.) to each of the data values received from the nodes 732, 734, 736, 738, 740, and 742. The nodes 744, 746, and 748 may include different algorithms and/or different weights assigned to the data variables from the nodes 732, 734, 736, 738, 740, and 742 such that each of the nodes 744, 746, and 748 may produce a different value based on the same input values received from the nodes 732, 734, 736, 738, 740, and 742. In some embodiments, the weights that are initially assigned to the input values for each of the nodes 744, 746, and 748 may be randomly generated (e.g., using a computer randomizer). The values generated by the nodes 744, 746, and 748 may be used by the node 750 in the output layer 706 to produce an output value for the artificial neural network 700.

The artificial neural network 700 may be trained by using training data and one or more loss functions. By providing training data to the artificial neural network 700, the nodes 744, 746, and 748 in the hidden layer 704 may be trained (adjusted) based on the one or more loss functions (and also various hyperparameters) such that an optimal output is produced in the output layer 706 to minimize the loss in the loss functions. By continuously providing different sets of training data, and penalizing the artificial neural network 700 according to one or more hyperparameters when the output of the artificial neural network 700 is incorrect (as defined by the loss functions, etc.), the artificial neural network 700 (and specifically, the representations of the nodes in the hidden layer 704) may be trained (adjusted) to improve its performance in the respective tasks. Adjusting the artificial neural network 700 may include adjusting the weights associated with each node in the hidden layer 704.

Figure 8:
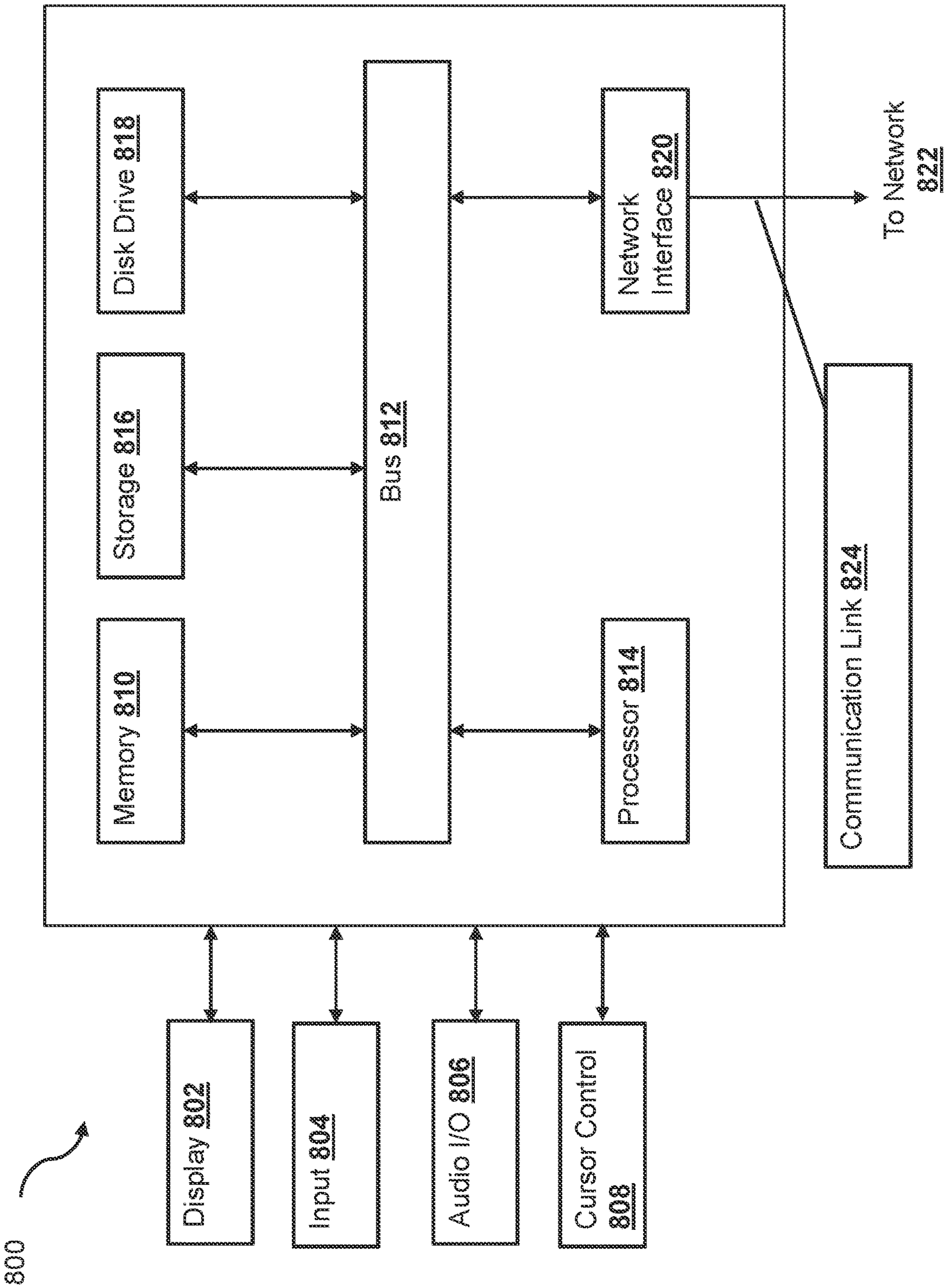
FIG. 8 is a block diagram of a system for implementing a device according to an embodiment of the present disclosure.

FIG. 8 is a block diagram of a computer system 800 suitable for implementing one or more embodiments of the present disclosure, including the service provider server 130, the merchant server 120, and the user device 110. In various implementations, the user device 110 may include a mobile cellular phone, personal computer (PC), laptop, wearable computing device, etc. adapted for wireless communication, and each of the service provider server 130 and the merchant server 120 may include a network computing device, such as a server. Thus, it should be appreciated that the devices 110, 120, and 130 may be implemented as the computer system 800 in a manner as follows.

The computer system 800 includes a bus 812 or other communication mechanism for communicating information data, signals, and information between various components of the computer system 800. The components include an input/output (I/O) component 804 that processes a user (i.e., sender, recipient, service provider) action, such as selecting keys from a keypad/keyboard, selecting one or more buttons or links, etc., and sends a corresponding signal to the bus 812. The I/O component 804 may also include an output component, such as a display 802 and a cursor control 808 (such as a keyboard, keypad, mouse, etc.). The display 802 may be configured to present a login page for logging into a user account or a checkout page for purchasing an item from a merchant. An optional audio input/output component 806 may also be included to allow a user to use voice for inputting information by converting audio signals. The audio I/O component 806 may allow the user to hear audio. A transceiver or network interface 820 transmits and receives signals between the computer system 800 and other devices, such as another user device, a merchant server, or a service provider server via a network 822. In one embodiment, the transmission is wireless, although other transmission mediums and methods may also be suitable. A processor 814, which can be a micro-controller, digital signal processor (DSP), or other processing component, processes these various signals, such as for display on the computer system 800 or transmission to other devices via a communication link 824. The processor 814 may also control transmission of information, such as cookies or IP addresses, to other devices.

The components of the computer system 800 also include a system memory component 810 (e.g., RAM), a static storage component 816 (e.g., ROM), and/or a disk drive 818 (e.g., a solid-state drive, a hard drive). The computer system 800 performs specific operations by the processor 814 and other components by executing one or more sequences of instructions contained in the system memory component 810. For example, the processor 814 can perform the graph analysis functionalities described herein, for example, according to the process 600.

Logic may be encoded in a computer readable medium, which may refer to any medium that participates in providing instructions to the processor 814 for execution. Such a medium may take many forms, including but not limited to, non-volatile media, volatile media, and transmission media. In various implementations, non-volatile media includes optical or magnetic disks, volatile media includes dynamic memory, such as the system memory component 810, and transmission media includes coaxial cables, copper wire, and fiber optics, including wires that comprise the bus 812. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 800. In various other embodiments of the present disclosure, a plurality of computer systems 800 coupled by the communication link 824 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:

a non-transitory memory; and one or more hardware processors coupled with the non-transitory memory and configured to read instructions from the non-transitory memory to cause the system to perform operations comprising:

receiving a sequence of graphs corresponding to a plurality of time periods, wherein each graph in the sequence of graphs represents transactions conducted in a corresponding time period of the plurality of time periods, wherein each graph in the sequence of graphs comprises nodes and edges, and wherein each edge that connects two nodes in a graph of the sequence of graphs represents a transaction conducted by two accounts represented by the two nodes during the corresponding time period;

determining, for the nodes, positions within a node feature space based on node features associated with corresponding accounts represented by the nodes, wherein the node features are determined independent from topological structures of the sequence of graphs;

clustering the nodes in each of the sequence of graphs into a plurality of clusters based on the positions of the nodes within the node feature space;

deriving, based on the plurality of clusters, one or more prototypes that represent patterns associated with the positions of the nodes within the node feature space;

modifying the sequence of graphs, wherein the modifying the sequence of graphs comprises embedding the one or more prototypes into the nodes of the sequence of graphs;

classifying the nodes using a machine learning model system and based on the modified sequence of graphs; and modifying an access level associated with an account represented by one of the nodes from the sequence of graphs based on the classifying.

2. The system of claim 1, wherein the operations further comprise:

providing the sequence of graphs to a first model in the machine learning model system; and obtaining a set of intermediate outputs from the first model, wherein the modifying the sequence of graphs further comprises embedding the set of intermediate outputs into the nodes of the sequence of graphs.

3. The system of claim 1, wherein the one or more prototypes comprise a first set of prototypes representing evolving patterns associated with the nodes across the plurality of time periods.

4. The system of claim 3, wherein the one or more prototypes further comprise a second set of prototypes representing persistent patterns associated with the nodes over the plurality of time periods.

5. The system of claim 1, wherein the operations further comprise:

sequentially analyzing clusters, from the plurality of clusters, corresponding to each graph in the sequence of graphs, wherein the one or more prototypes are derived based on the sequentially analyzing the clusters.

6. The system of claim 1, wherein the node feature space comprises a plurality of feature dimensions.

7. The system of claim 1, wherein the operations further comprise:

collectively analyzing the plurality of clusters corresponding to the sequence of graphs, wherein the one or more prototypes are derived based on the collectively analyzing the plurality of clusters.

8. The system of claim 1, wherein the machine learning model system is configured to classify the nodes based on the topological structures of the sequence of graphs and the one or more prototypes embedded within the nodes of the sequence of graphs.

9. A method, comprising:

receiving one or more graphs representing transactions conducted in one or more time periods, wherein the one or more graphs comprise nodes and edges, and wherein each edge that connects two nodes in the one or more graphs represents a transaction conducted by two accounts represented by the two nodes during a corresponding time period;

determining, by a computer system and for the nodes, positions within a node feature space based on node features associated with corresponding accounts represented by the nodes, wherein the node features are determined independent from a topological structure of the one or more graphs;

clustering, by the computer system, the nodes in the one or more graphs into a plurality of clusters based on the positions of the nodes within the node feature space;

deriving, by the computer system and based on the plurality of clusters, a set of prototypes representing patterns associated with the nodes within the node feature space;

modifying, by the computer system, the one or more graphs, wherein the modifying the one or more graphs comprises embedding the set of prototypes into the nodes of the one or more graphs;

classifying, by the computer system, the nodes using a machine learning model system and based on the one or more modified graphs; and causing, by the computer system, an access level associated with an account corresponding to one of the nodes to be modified based on the classifying.

10. The method of claim 9, wherein each node in the one or more graphs represents a cryptocurrency wallet, and wherein the transaction is a cryptocurrency transaction conducted between two cryptocurrency wallets represented by the two nodes.

11. The method of claim 10, wherein the classifying comprises determining that the one of the nodes represents a particular cryptocurrency wallet that has been used to conduct malicious activities.

12. The method of claim 9, wherein the node features comprise at least one of a number of outgoing transactions conducted through a cryptocurrency wallet represented by a node of the one or more graphs, a number of incoming transactions conducted through the cryptocurrency wallet represented by the node, an average amount associated with transactions conducted through the cryptocurrency wallet represented by the node, an average time between transactions conducted through the cryptocurrency wallet represented by the node, or statistical data associated with neighboring nodes of the node.

13. The method of claim 9, wherein the set of prototypes represents evolving characteristics of the plurality of clusters over the one or more time periods.

14. The method of claim 9, wherein the set of prototypes represents persistent characteristics of the plurality of clusters across the one or more time periods.

15. The method of claim 9, wherein each prototype in the set of prototypes represents attributes associated with a corresponding cluster from the plurality of clusters.

16. A non-transitory machine-readable medium having stored thereon machine-readable instructions executable to cause a machine to perform operations comprising:

accessing a sequence of graphs representing transactions conducted in a plurality of corresponding time periods, wherein each graph in the sequence of graphs comprises nodes and edges, and wherein each edge that connects two nodes in a graph of the sequence of graphs represents a transaction conducted by two accounts represented by the two nodes during a corresponding time period from the plurality of corresponding time periods;

determining, for the nodes, positions within a node feature space based on node features associated with corresponding accounts represented by the nodes, wherein the node features are determined independent from topological structures of the sequence of graphs;

clustering the nodes of each graph in the sequence of graphs into a plurality of clusters based on the positions of the nodes within the node feature space;

deriving, based on the plurality of clusters, a first set of prototypes representing patterns associated with the nodes within the node feature space;

modifying the sequence of graphs, wherein the modifying the sequence of graphs comprises embedding the first set of prototypes into the nodes of the sequence of graphs; and classifying the nodes using a machine learning model system and based on the modified sequence of graphs.

17. The non-transitory machine-readable medium of claim 16, wherein the operations further comprise:

sequentially analyzing clusters, from the plurality of clusters, corresponding to each graph in the sequence of graphs; and deriving the first set of prototypes based on the sequentially analyzing the clusters.

18. The non-transitory machine-readable medium of claim 16, wherein the first set of prototypes represents evolving characteristics of the plurality of clusters over the plurality of corresponding time periods.

19. The non-transitory machine-readable medium of claim 16, wherein the operations further comprise:

collectively analyzing the plurality of clusters corresponding to the sequence of graphs; and deriving a second set of prototypes based on the collectively analyzing the plurality of clusters, wherein the modifying the sequence of graphs further comprises embedding the second set of prototypes into the nodes.

20. The non-transitory machine-readable medium of claim 19, wherein the second set of prototypes represents persistent characteristics of the plurality of clusters across the plurality of corresponding time periods.

* * * * *